US012808988B2

(12) United States Patent
Rafique

(10) Patent No.: US 12,808,988 B2
(45) Date of Patent: Nov. 24, 2026

(54) RADAR-BASED DETECTION OF HAND GESTURES VIA A COMMUNICATION DEVICE

(71) Applicant: Telefonaktiebolaget LM Ericsson (publ), Stockholm (SE)

(72) Inventor: Raihan Rafique, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 206 days.

(21) Appl. No.: 18/716,406

(22) PCT Filed: Dec. 9, 2021

(86) PCT No.: PCT/EP2021/084930
§ 371 (c)(1),
(2) Date: Jun. 4, 2024

(87) PCT Pub. No.: WO2023/104307
PCT Pub. Date: Jun. 15, 2023

(65) Prior Publication Data
US 2025/0035747 A1 Jan. 30, 2025

(51) Int. Cl.
*G01S 7/41* (2006.01)
*G01S 7/00* (2006.01)
(Continued)

(52) U.S. Cl.
CPC .............. *G01S 7/415* (2013.01); *G01S 7/006* (2013.01); *G01S 7/295* (2013.01); *G01S 7/2886* (2021.05)

(58) Field of Classification Search
None
See application file for complete search history.

(56) References Cited

U.S. PATENT DOCUMENTS 8,483,617 B2 * 7/2013 Rofougaran ............ G06F 3/017 455/63.4
9,074,884 B2 7/2015 Bchel
(Continued)

FOREIGN PATENT DOCUMENTS

JP 2021504771 A 2/2021

OTHER PUBLICATIONS

Ahmed, Shahzad , et al., "Hand Gestures Recognition Using Radar Sensors for Human-Computer-Interaction: A Review", Remote Sens, 13,527, https://doi.org/10.3390/rs13030527, 2021, 24 pages.
(Continued)

*Primary Examiner* — Bernarr E Gregory
(74) *Attorney, Agent, or Firm* — Murphy, Bilak & Homiller, PLLC

(57) ABSTRACT

A communication device (10) and corresponding method (700) of operation provide for gesture recognition, based on reusing communication circuitry (12) of the device (10) for radar-based detection of hand gestures by a user of the device (10). An advantageous aspect of operation in one or more embodiments is the use of an aggregation of individual communication-signal receivers (52) of the device (10), to receive reflection signals (62) corresponding to radar pulses (60) emitted from the device (10). Another advantageous aspect of operation in one or more embodiments is the use of a gesture recognition algorithm (78), such as Convolutional Neural Network (CNN) or other Machine Learning (ML) algorithm, to evaluate measurement data (76) obtained from the reflection signals (62), for reliable recognition of defined gestures.

19 Claims, 10 Drawing Sheets

(51) Int. Cl.

| | |
|---|---|
| ***G01S 7/295*** | (2006.01) |
| *G01S 7/288* | (2006.01) |

(56) References Cited

U.S. PATENT DOCUMENTS

| | | | | |
|---|---|---|---|---|
| 9,965,174 | B2 | 5/2018 | Herbordt et al. | |
| 10,177,451 | B1 | 1/2019 | Baraban et al. | |
| 10,218,407 | B2 | 2/2019 | Trotta et al. | |
| 10,928,499 | B2 | 2/2021 | Mihajlovićet al. | |
| 11,016,574 | B2 * | 5/2021 | Williams | G06F 3/017 |
| 2014/0105256 | A1 | 4/2014 | Hanevich et al. | |
| 2016/0041618 | A1 * | 2/2016 | Poupyrev | G01S 7/415 342/61 |
| 2016/0178730 | A1 * | 6/2016 | Trotta | G01S 7/006 342/175 |
| 2017/0131395 | A1 * | 5/2017 | Reynolds | G06F 3/017 |
| 2018/0199377 | A1 * | 7/2018 | Sanderovich | G01S 7/023 |
| 2019/0293781 | A1 | 9/2019 | Bolin et al. | |
| 2020/0097092 | A1 | 3/2020 | Tzadok | |
| 2020/0119780 | A1 | 4/2020 | Klemmer | |
| 2020/0319302 | A1 * | 10/2020 | Nanzer | G06F 3/017 |
| 2020/0319327 | A1 | 10/2020 | Tsvelykh et al. | |
| 2020/0356178 | A1 | 11/2020 | Qiu et al. | |
| 2021/0034160 | A1 | 2/2021 | Hof et al. | |
| 2021/0103031 | A1 | 4/2021 | Cohen et al. | |
| 2021/0132788 | A1 | 5/2021 | Giusti et al. | |
| 2021/0232228 | A1 | 7/2021 | Nguyen et al. | |
| 2021/0342008 | A1 | 11/2021 | Sachidanandam et al. | |

OTHER PUBLICATIONS

Bairagi, Anupam Kumar, et al., "A Matching Based Coexistence Mechanism between eMBB and uRLLC in 5G Wireless Networks", SAC '19: Proceedings of the 34th ACM/SIGAPP Symposium on Applied Computing, Apr. 2019, 2377-2384.

Gope, Dejan Chandra, "Hand Gesture Interaction with Human-Computer", Global Journal of Computer Science and Technology, vol. 11, Issue 23, Version 1.0, Dec. 2011, 11 pages.

Heunisch, Sebastian , et al., "Millimeter-Wave Pulse Radar Scattering Measurements on the Human Hand", IEEE Antennas and Wireless Propagation Letters, vol. 18, No. 7, Jul. 2019, 4 pages.

Leem, Seong Kyu, et al., "Vital Sign Monitoring and Mobile Phone Usage Detection Using IR-UWB Radar for Intended Use in Car Crash Prevention", Sensors 2017, 17, 1240, doi: 10.3390/s17061240, www.mdpi.com/journal/sensors, 2017, 25 pages.

Michelucci, Umberto , "Advanced Applied Deep Learning: Convolutional Neural Networks and Object Detection", Apress, available for purchase on Springer Link (https://link.springer.com/book/10.1007/978-1-4842-4976-5#about-this-book), 2019.

Ren, Yuwei , et al., "Hand gesture recognition using 802.11ad mmWave sensor in the mobile device", 2021 IEEE Wireless Communications and Networking Conference Workshops (WCNCW), doi: 10.1109/WCNCW49093.2021.9419978, Mar. 29, 2021, 1 page.

Wu, Weixin , et al., "Real-time Hand Gesture Recognition Based on Deep Learning in Complex Environments", IEEE Xplore, 2019, 6 pages.

* cited by examiner

RADAR-BASED DETECTION OF HAND GESTURES VIA A COMMUNICATION DEVICE

TECHNICAL FIELD

A communication device and corresponding method of operation provide for gesture recognition using a gesture recognition algorithm to recognize defined gestures and reusing communication circuitry of the device for radar-based detection of hand gestures by a user of the device.

BACKGROUND

Incorporating gesture recognition capabilities into handheld devices poses a number of challenges. Such devices may be held or positioned at different angles, which changes the perspective and distance between the device sensor used for gesture recognition and a hand of the user. Changing perspectives and distances complicate the ability to detect gestures with the kinds of reliability and responsiveness needed for a satisfying user experience. Other problems are more prosaic, such as difficulties in accommodating gesture-sensing systems into devices that have severe constraints on size, power consumption, and cost.

Known approaches to gesture recognition include the use of vision-based recognition or the use of radar-based recognition. While both technologies have attendant advantages, the use of either involves complications in the context of smaller handheld devices, for at least some of the reasons noted above. For example, a typical approach to radar-based gesture recognition in a handheld communication device involves the addition of dedicated radar circuitry. See, Shahzad Ahmed, Karam Dad Kallu, Sarfaraz Ahmed, and Sung Ho Cho. "Hand Gestures Recognition Using Radar Sensors for Human-Computer-Interaction: A Review." Remote Sens. 2021, 13 (3), 527.

Achieving suitable resolution for hand gesture detection using radar requires the use of high signal frequencies, e.g., at or above 60 GHz. Detection distances are not far, typically, in the context of handheld devices. Further, in a pulsed radar context, the short detection distances typical for a handheld device, e.g., on the order of 10 centimeters in some scenarios, necessitate the use of short radar pulses, e.g., pulses of 100 picoseconds or less. Complications attend the reception and processing of the return reflections corresponding to the emitted radar pulses, as a consequence of the wide bandwidths needed to receive such signals, and further because of the complexities associated with reliably recognizing hand gestures from the reflection signals.

SUMMARY

A communication device and corresponding method of operation provide for gesture recognition, based on reusing communication circuitry of the device for radar-based detection of hand gestures by a user of the device. An advantageous aspect of operation in one or more embodiments is the use of an aggregation of individual communication-signal receivers of the device, to receive reflection signals corresponding to radar pulses emitted from the device. Another advantageous aspect of operation in one or more embodiments is the use of a gesture recognition algorithm, such as a Convolutional Neural Network (CNN) or other Machine Learning (ML) algorithm, to evaluate measurement data obtained from the reflection signals, for reliable recognition of defined gestures.

An example embodiment comprises a method of operation by a communication device. Method steps or operations include performing gesture detection by transmitting a plurality of radar pulses from an antenna of the communication device and receiving reflection signals corresponding to respective ones of the radar pulses. Each reflection signal has a signal bandwidth greater than a receiver bandwidth of individual communication-signal receivers of the communication device. Each reflection signal is received using an aggregation of the individual communication-signal receivers, with each individual communication-signal receiver in the aggregation tuned to receive signal components of the reflection signal that are within a respective frequency bin of the reflection signal and outputting a corresponding bin signal. Further method operations include the device generating measurement data by performing measurements on the respective bin signals obtained for the plurality of radar pulses, evaluating the measurement data via a gesture recognition algorithm trained to detect a plurality of defined hand gestures, and initiating a corresponding control action in the communication device, responsive to the gesture recognition algorithm detecting one of the plurality of defined hand gestures.

Another example embodiment comprises a communication device that includes communication circuitry and processing circuitry. The processing circuitry is configured to control the communication circuitry to transmit a plurality of radar pulses from an antenna of the communication device and receive reflection signals corresponding to respective ones of the radar pulses. Each reflection signal has a signal bandwidth greater than a receiver bandwidth of individual communication-signal receivers of the communication device. Each reflection signal is received using an aggregation of the individual communication-signal receivers, with each individual communication-signal receiver in the aggregation tuned to receive signal components of the reflection signal that are within a respective frequency bin of the reflection signal and outputting a corresponding bin signal. The processing circuitry is further configured to generate measurement data by performing measurements on the respective bin signals obtained for the plurality of radar pulses, evaluate the measurement data via a gesture recognition algorithm trained to detect a plurality of defined hand gestures, and initiate a corresponding control action in the communication device, responsive to the gesture recognition algorithm detecting one of the plurality of defined hand gestures.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
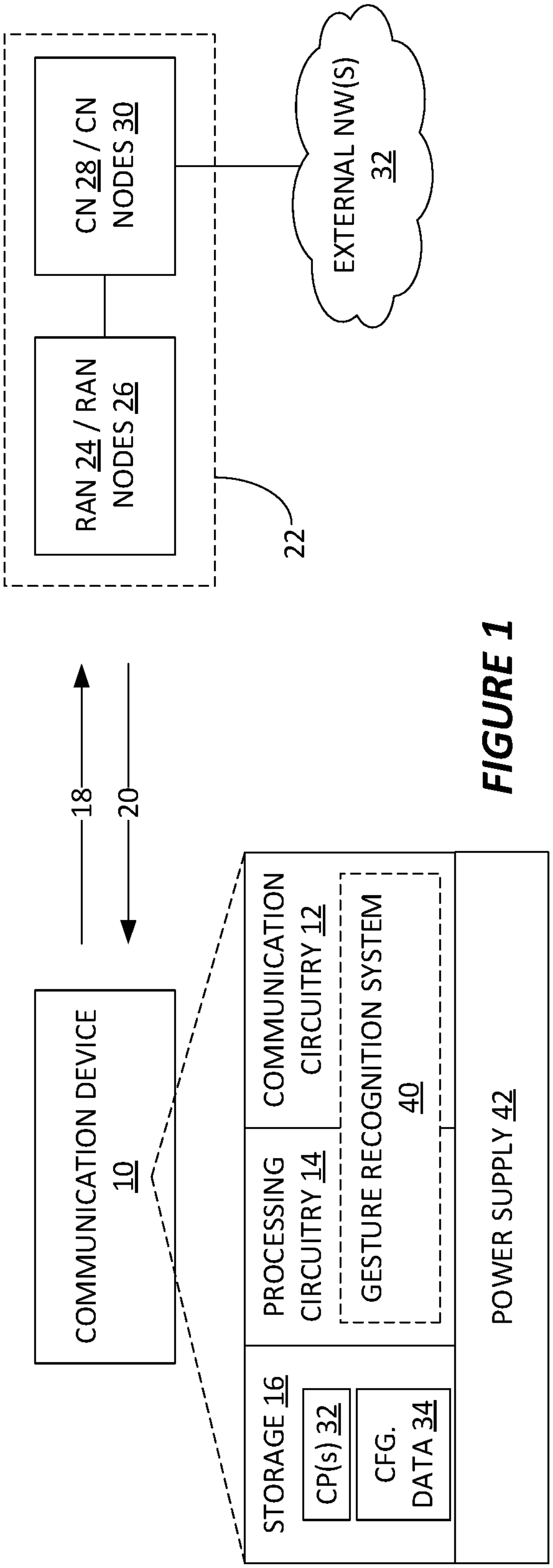
FIG. 1 is a block diagram of one embodiment of a communication device that is configured for gesture recognition, shown in context with a wireless communication network.

FIG. 1 illustrates a communication device 10 according to one or more embodiments. The device 10 comprises communication circuitry 12, processing circuitry 14, and storage 16. The processing circuitry 14 is configured to cooperate with the communication circuitry 12 to transmit communication signals 18 and receive communication signals 20, such as may be exchanged between the device 10 and a wireless communication network 22.

An example network 22 comprises a wireless communication network, such as a Fifth Generation (5G) New Radio (NR) network operating according to specifications promulgated by the Third Generation Partnership Project (3GPP). The network 22 includes a Radio Access Network (RAN) 24 comprising one or more radio network nodes 26, such as base stations or other types of access points. A Core Network (CN) 28 includes one or more CN nodes 30 that provide authentication and mobility management functions for connecting the device 10 to the network 22, along with communicatively coupling the device 10 to one or more external networks 32, such as the Internet.

The communication circuitry 12 comprises radiofrequency (RF) transceiver circuitry, e.g., circuitry configured to transmit RF signals generated from baseband information signals containing data to be transmitted and configured to output baseband information signals containing data obtained from received RF signals. In this regard, the communication circuitry 12 may be understood as comprising analog RF circuitry, along with at least some baseband processing circuitry and operating as radio modem. In turn, the processing circuitry 14 generates or otherwise provides baseband information signals for transmission via the communication circuitry 12 and processes or otherwise handles baseband information signals obtained from received RF signals.

In one or more embodiments, the processing circuitry 14 comprises one or more microcontrollers or other digital processors that are specially adapted based on execution of computer program instructions stored in a computer readable media, such as provided by the storage 16. FIG. 1 suggests such an arrangement by depicting the storage 16 as storing one or more computer programs 32—denoted as "CP(s)" in the diagram-along with storing one or more items of configuration data 34-"CFG. DATA" in the diagram.

A point of interest herein is the implementation of a gesture recognition system 40 via the processing circuitry 14 and the communication circuitry 12. Reuse of the communication circuitry 12 for gesture recognition and particular aspects of that reuse represent one among several advantages of the gesture recognition system, which allows a user of the device 10 to interact with the device 10, based on the device 10 detecting and responding to hand gestures by the user. Another advantageous aspect is implementation of a gesture recognition algorithm that provides for reliable recognition of a user's hand gestures from measurement data obtained from radar-based "imaging" of the user's hand.

A further element of the device 10 according to the example of FIG. 1 is the power supply 42. In at least one embodiment, the power supply 42 is battery-based, which suits implementation of the device 10 as a handheld or otherwise mobile device, such as a smart phone or other personal computing or media device with communication capability.

Figure 2:
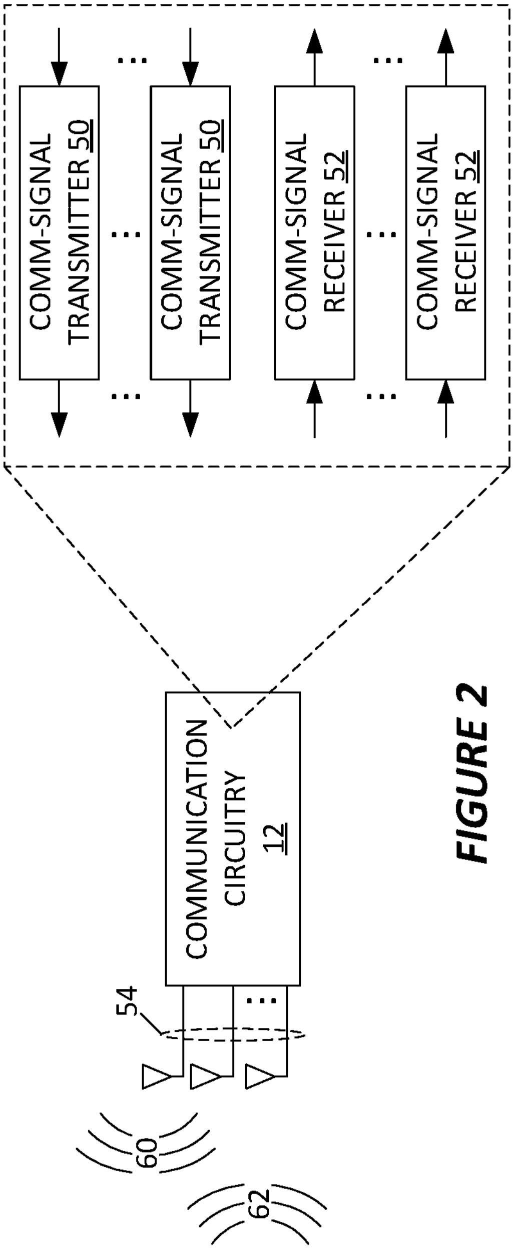
FIG. 2 is a block diagram of details for communication circuitry of a communication device, according to one embodiment.

FIG. 2 depicts an example embodiment of the communication circuitry 12 as including at least one communication-signal transmitter 50 and a plurality of communication signal receivers 52. Each communication-signal receiver 52 comprises a receiver chain or received-signal processing path, with each path corresponding to a respective one among a plurality of antennas 54 of the device 10. The antennas 54 may be elements of an antenna array used for reception beamforming by the device 10. With reception beamforming, an incoming RF signal impinges on each of the antennas 54 and the per-antenna signals feed into their respective signal processing paths-respective communication-signal receivers 52. As such, the device 10 has multiple antenna-specific versions of the same received signal, where those multiple signals can be respectively weighted according to a beamforming vector and coherently combined. Beamforming may be done either in the analog domain or the digital domain.

Detection of hand gestures is based on the device 10 emitting radar pulses 60 and repurposing a plurality of the communication-signal receivers 52 of the device 10 for reception of reflection signals 62 corresponding to the emitted radar pulses 60. Transmission of radar pulses 60 relies on reuse of one or more communication-signal transmitters 50 of the device 10 or involves use of a dedicated pulse transmitter.

However, the transmitted radar pulses 60 and the corresponding reflection signals have signal bandwidths that exceed the receiver bandwidth of the individual communication-signal receivers 52. An advantageous aspect of gesture detection operations disclosed herein is that the device 10 compensates for that fact by tuning each one of the communication-signal receivers 52 that are used for reflection-signal reception to a different spectral segment-frequency band—of the reflection signals 62. That is, for reflection-signal reception, each communication-signal receiver 52 is tuned for reception of reflection-signal content in a respective segment of the spectrum that is nominally spanned by the reflection signals 62.

Figure 3:
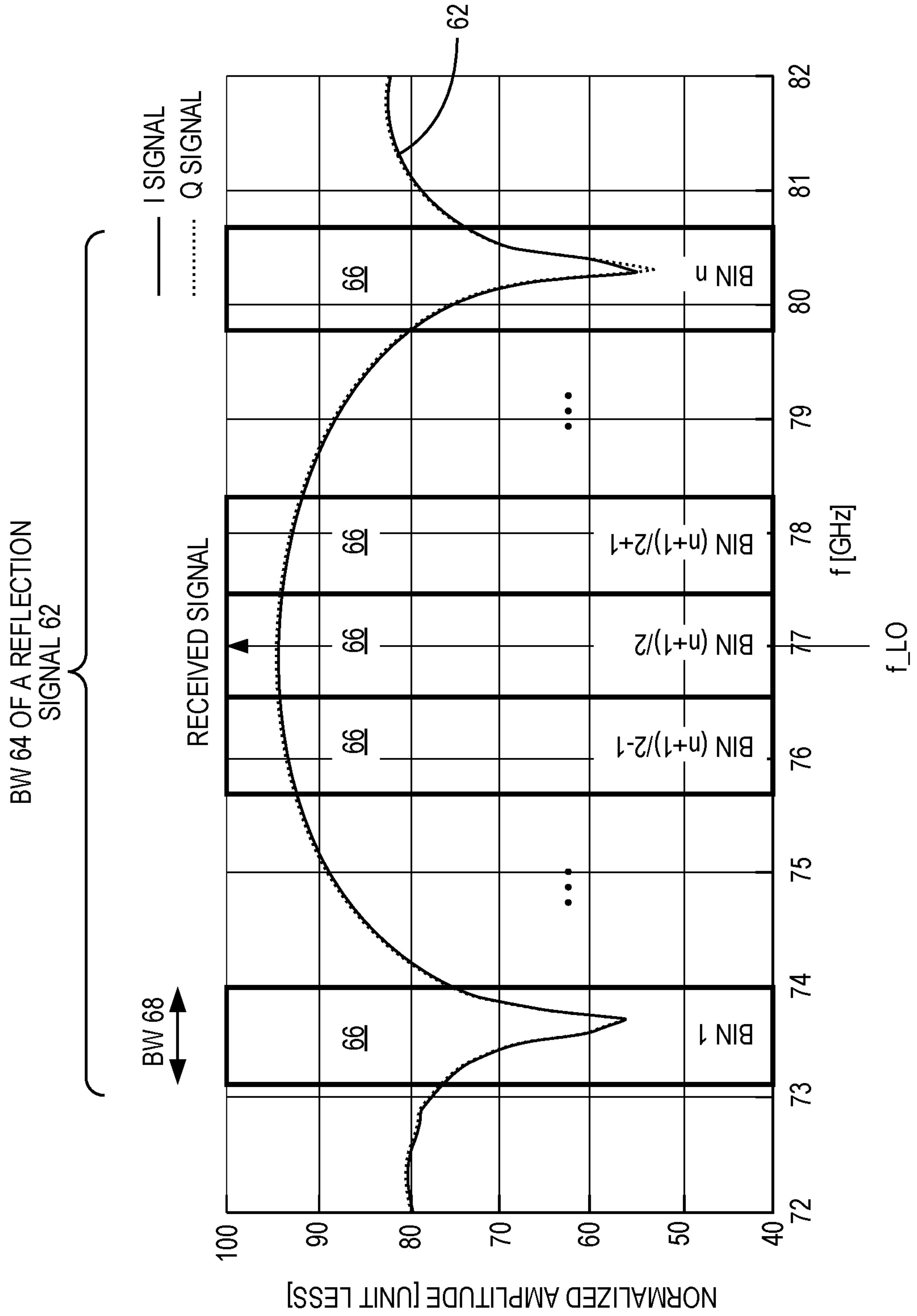
FIG. 3 is a plot of an example waveform for a reflection signal corresponding to an emitted radar pulse, in terms of spectrum and bandwidth, and an advantageous subdividing of the reflection signal into frequency bins, according to one embodiment.

FIG. 3 illustrates an example reflection signal 62, having a center frequency of 77 Giga Hertz (GHz) and having a (main-lobe) signal bandwidth 64 that spans the electromagnetic spectrum from about 73 GHZ to about 81 GHZ. The gesture recognition system 40 effectively divides the spectrum of the reflection signal 62 into a plurality of frequency bins 66, with each frequency bin 66 representing the receiver bandwidth of a respective one of the individual communication-signal receivers 52 that are used in aggregation, to receive the reflection signal 62. Aggregating the communication-signal receivers 52 in this manner involves tuning each receiver 52 in the aggregation such that its receiver bandwidth 68 is positioned at a respective one of the frequency bins 66.

Figure 4:
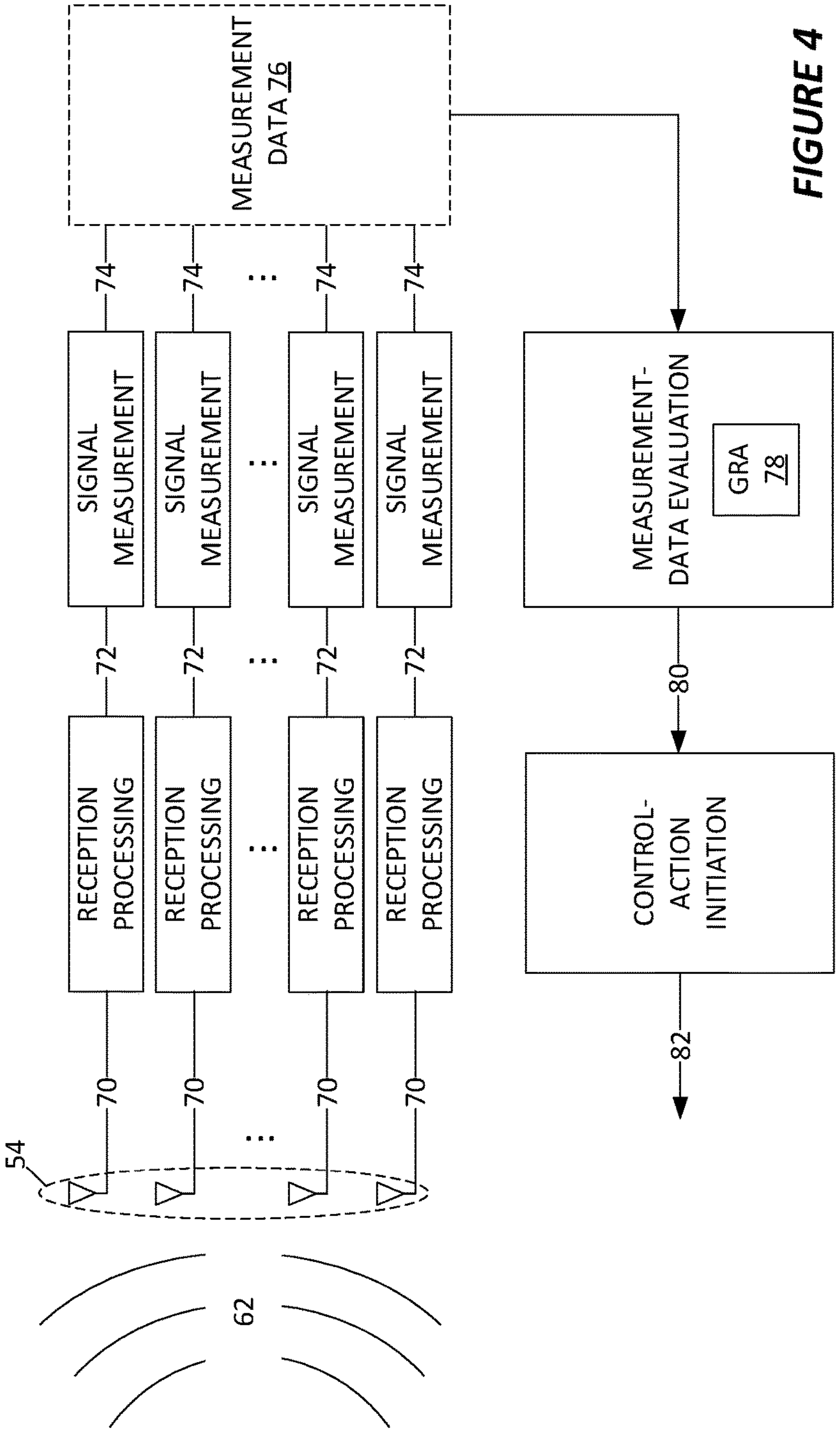
FIG. 4 is a block diagram of a signal processing and data flow, for reflection-signal reception, processing, and evaluation by a communication device, according to one embodiment.

FIG. 4 depicts an example signal-processing or data flow in the context of using an aggregated receiver—i.e., an aggregation of individually-tuned receivers—to receive reflection signal 62 corresponding to radar pulses 60 emitted by the device 10. FIG. 4 illustrates a reflection signal 62 impinging on a plurality of antennas 70 of the device 10, yielding per-antenna signals 70. Reception processing of each per-antenna signal 70 includes, for example, filtering, amplification, downconversion, and digitization, and yields corresponding bin signals 72. Each bin signal 72 corresponds to a respective one of the communication-signal receivers 52 used in aggregation for reception of the reflection signal 62. Each bin signal 72 therefore corresponds to the signal component of the reflection signal 62 that falls within the frequency bin to which the corresponding receiver 52 is tuned.

Circuitry in the device 10 performs measurements on the bin signals 72, yielding corresponding signal measurements 74 for each bin signal 72. Example measurements made on each reflection signal 62 are signal power measurements reflecting the intensity of the bin signal 72 at respective measurement sample times within a sampling window referenced to the emission of the corresponding radar pulse 60.

The length of the sampling window corresponds to the detection range of the device 10—i.e., the window defines the interval subsequent to emission of a radar pulse 60 during which the device 10 monitors for the corresponding reflection signal 62. Consequently, the reflection signal 62 received in correspondence with emission of a given radar pulse 60 should be understood as potentially containing multiple reflections, in dependence on local scattering of the radar pulse 60. Another way of viewing each reflection signal 62 is that it may be a composite of multiple return reflections, in dependence on the number, positioning, and nature of local objects illuminated by the radar pulse 60.

The signal measurements 74 provided by each reception processing path comprise, for example, signal-intensity measurements taken at a defined sampling rate. As such, for each emitted radar pulse 60, the gesture detection system 40 obtains a plurality of measurement sets, with one measurement set corresponding to each reception processing path—i.e., each measurement set corresponds to a respective frequency bin of the reflection signal 62 being measured and it comprises signal measurements taken for the reflection signal 62 within that portion of the overall signal spectrum occupied by the respective frequency bin. With gesture detection based on emitting series of radar pulses 60—e.g., a coherent burst of radar pulses 60—and collecting measurement sets for each radar pulse 60, the gesture recognition system 40 builds up measurement data 76 over the set of radar pulses 60. As such, the measurement data 76 comprises or is derived from the signal measurements 74 made at the defined sampling times for each frequency bin of each corresponding reflection signal 62, for all radar pulses 60 within a given set of radar pulses 60.

A measurement-data evaluation process evaluates the measurement data 76 according to a gesture recognition algorithm (GRA) 78, and produces a detection output 80, at least in instances where the GRA 78 determines that the measurement data 76 is characteristic of a gesture that is among a defined set of gestures that are recognizable by the gesture recognition system 40.

Figure 5A:
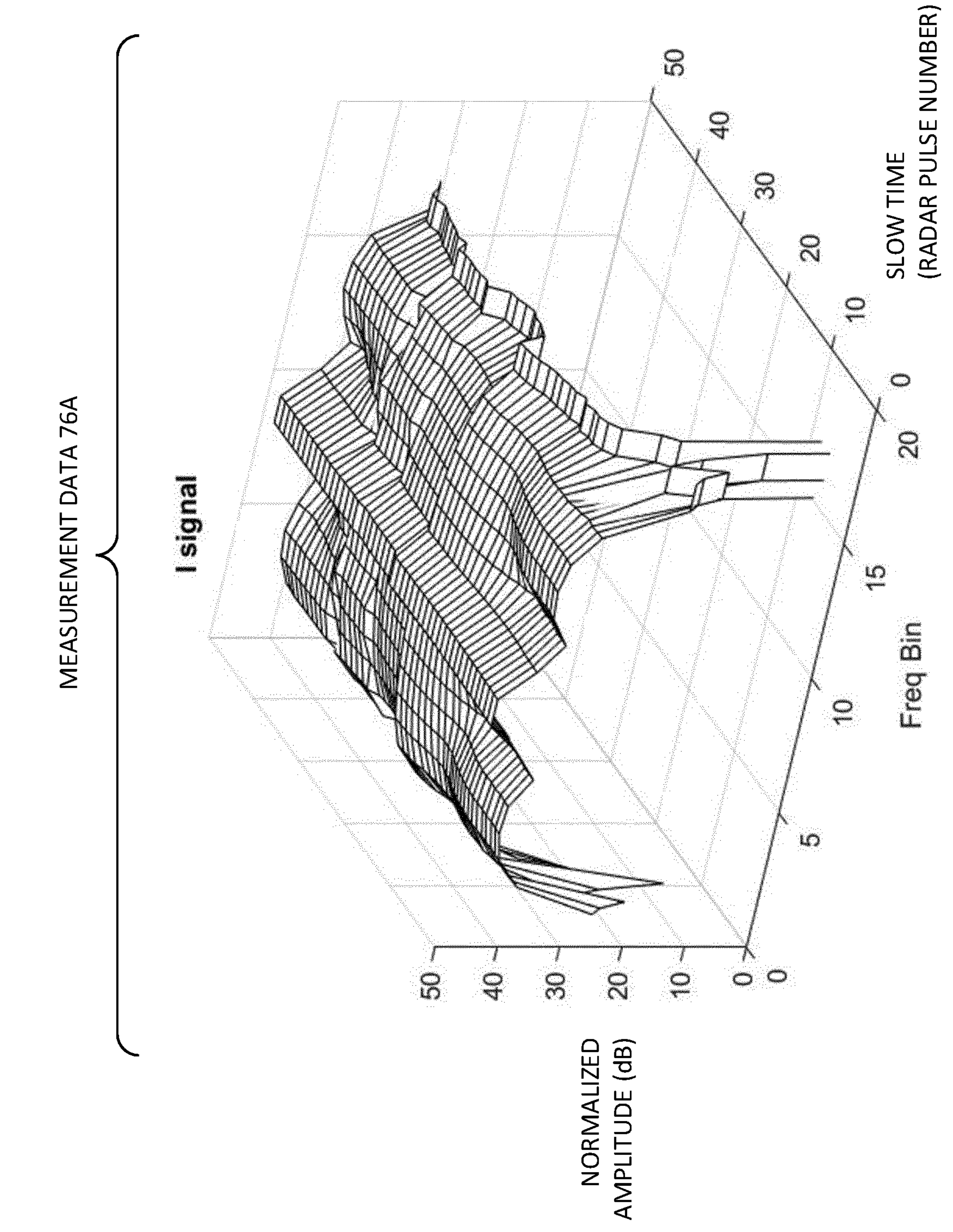
FIGS. 5A and 5B are diagrams of a data structure comprising measurement data obtained for I and Q components of a received reflection signal, according to one embodiment.
Figure 5B:
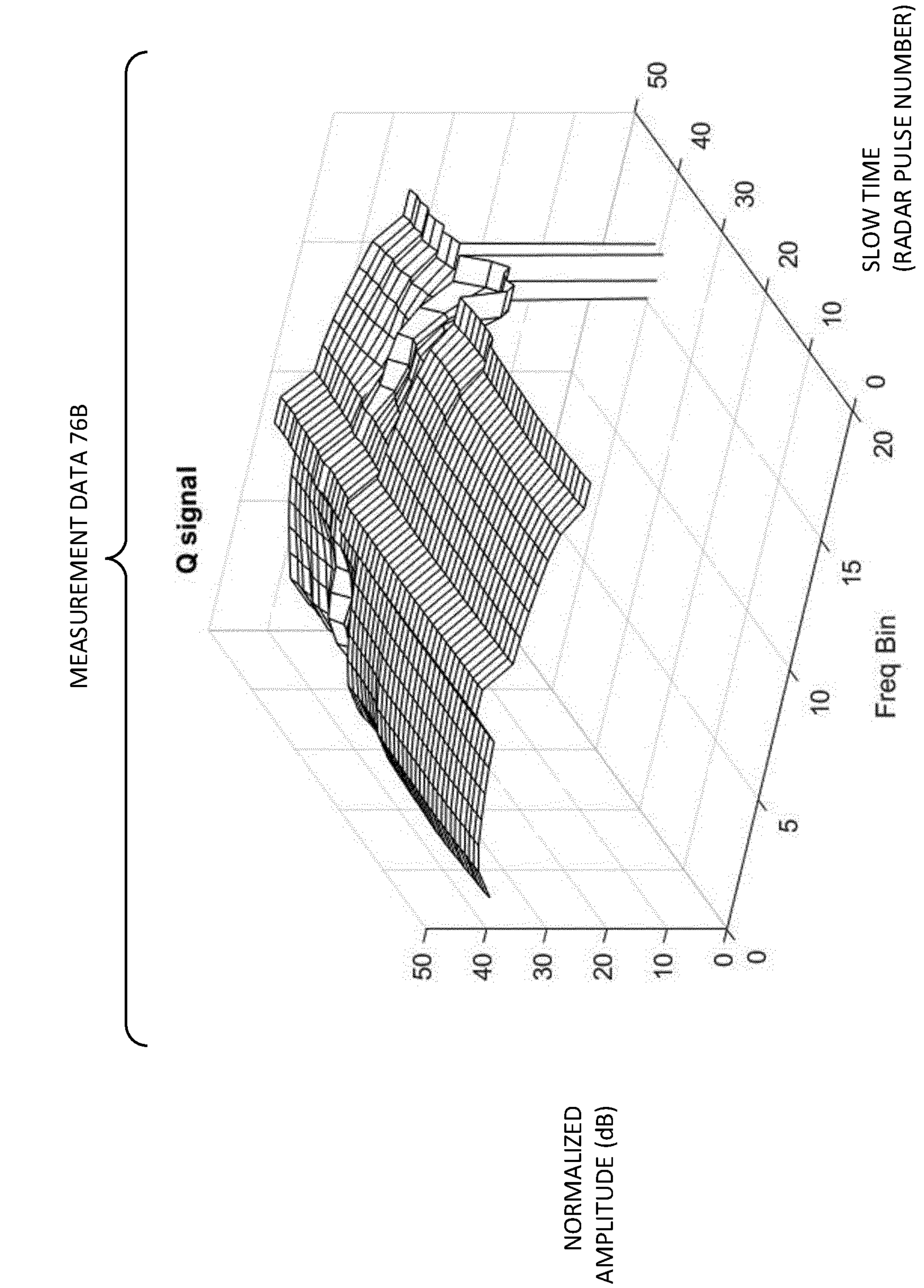

FIGS. 5A and 5B illustrate the measurement data 76 according to one embodiment. The bin signal 72 provided by each communication-signal receiver 52 with respect to a given reflection signal 62 comprises an In-phase (I) and Quadrature (Q) signal pair, such that signal measurements 74 obtained for each frequency bin of the reflection signal 62 comprise a joint set of measurements for the I and Q signal pair comprising the bin signal 72. Aggregating the per-bin measurements made for each radar pulse 60 over a set of radar pulses 60 yields a two-dimensional data set that may be understood as a type of "radar image." FIG. 5A depicts example I-component data 76A comprised in one such data set, while FIG. 5B depicts example Q-component data 76B comprised in the same data set.

Thus, an example format of the measurement data 76 as a radar image comprises a two-dimensional (2D) data set. One dimension or axis of the data set is defined by a transmission window over which the plurality of radar pulses 60 is emitted—e.g., this dimension is indexed by pulse count, such as radar pulse 1, radar pulse 2, and so on. The other dimension or axis of the data set is defined by the sampling window over which the communication device 10 receives a reflection signal 62 corresponding to one of the emitted radar pulses 60—this dimension is indexed by sample count. The dimension index by radar pulse count may be referred to as a "slow time" dimension, and the dimension indexed by sample count may be referred to as a "fast time" dimension, or, more particularly, as a "fast frequency bin" dimension, as the reflection-signal samples are taken on a per bin basis.

Broadly, each reflection signal 62 is represented as a set of signal measurements for each bin 66, i.e., a measurement at sample time 1, a measurement at sample time 2, and so on, up to the maximum number of samples that are taken for each reflection signal. Put another way, detecting a gesture comprises emitting a plurality of radar pulses 60 and measuring the corresponding reflection signal 62 for each radar pulse 60. Each reflection signal 62 is represented by sample values taken at each of a plurality of sample times. At each sample time, a sample value (measurement) is taken for each bin signal 72. Using the example details depicted in FIGS. 5A and 5B, the measurement data 76 in one or more embodiments comprises I and Q signal-intensity measurements obtained with respect to a set of fifty radar pulses 60, based on sixteen frequency bins 66 to subdivide the bandwidth 68 of the reflection signals 62.

While compositing the measurement data 76 as a radar image may offer advantageous detection processing in some embodiments, other data arrangements are contemplated for input to the GRA 78. In one example, the measurement data 76 may comprise per-bin/per-pulse measurements that are fed serially into the GRA 78, with the GRA 78 rearranging or compositing the data as needed for gesture-recognition processing.

At least one embodiment of the gesture recognition system 40 is based on implementation of the GRA 78 as a machine-learning based detector. A particular example involves implementation of the GRA 78 as a Convolutional Neural Network (CNN) that is trained to recognize individual gestures among a defined set of gestures. One or more particular embodiments of the GRA 78 as a CNN-based gesture detector relies on formation of the measurement data 76 in a radar-image format, such as shown in FIGS. 5A and 5B. In a two-dimensional (2D) "image" format, each "pixel" comprises a signal measurement (e.g., intensity) for a particular frequency bin 66, at a particular sampling time, for a particular radar pulse 60/reflection signal 62.

The CNN comprises an input layer configured to receive the measurement data 76 as input data, an output layer that outputs a value indicative of the gesture recognized from the measurement data 76, and a number of hidden layers between the input and output layers. The hidden layers include, for example, a convolutional layer, a pooling layer, and a fully-connected layer, which cooperate to detect patterns in the input data. Extensive example information regarding CNN theory, structure, and operation appears in Michelucci, Umberto, *Advanced Applied Deep Learning: Convolutional Neural Networks and Object Detection*, Apress 2019.

There may be a set of defined gestures that are recognizable by the gesture recognition system 40, and the detection output 80 depicted in FIG. 4 indicates when one of those gestures is detected. Of course, there may be particular gestures that are usable at any particular time, e.g., such as when particular software executing on the device 10 responds only to certain gestures. e.g., a subset of the universe of gestures that are recognizable by the gesture recognition system 40. Similarly, there may be a certain subset of gestures that are always usable, e.g., they relate to operating-system-level controls of the device 10 by the user.

In any case, the signal processing flow depicted in FIG. 4 continues with control-action initiation by the gesture recognition system 40. For example, the gesture recognition system 40 sends a message or other signaling 82 that identifies the particular gesture recognized. Such message may flow to a higher-level software application executing on the device 10 via an Application Programming Interface (API) offered by the operating system or execution environment of the device 10.

A "gesture recognition system 40" as understood in the context of this disclosure comprises processing circuitry and RF circuitry. A particular feature is that the RF circuitry includes communication-signal receivers 52 of the device 10 that are temporarily reconfigured from communications use, for use in receiving and processing reflection signals 62, for gesture detection. Further elements of the RF circuitry in at least one embodiment include, for example, control switches and corresponding frequency multipliers, which are used to generate radar pulses 60 and process corresponding reflection signals 62 at signal frequencies that are a multiple of the frequency/frequencies used for communication signals. For example, the device 10 transmits and/or receives communication signals in the range of 30 GHZ, whereas the radar pulses 60 have a frequency at some multiple of 30 GHZ, e.g., 2×30 GHZ=60 GHZ.

The gesture recognition system 40 also includes the control circuitry needed to control re-use of the communication circuitry 12 for gesture recognition, e.g., to multiplex the communication circuitry 12 or at least involved components therein between communications use and gesture-recognition use. The gesture recognition system 40 further includes the signal processing, e.g., associated with making signal measurements or at least compiling the measurement data 76, and the processing circuitry used to implement the GRA 78. In at least one embodiment, some or all of such processing circuitry is shared. For example, the processing circuitry 14 shown in FIG. 1 comprises one or more Digital Signal Processor (DSP), microprocessor, Application Specific Integrated Circuit (ASIC), Field Programmable Gate Arrays (FPGAs), or other digital processing circuitry that provides baseband processing of incoming and outgoing communication signals, with such circuitry also configured to provide gesture-recognition processing and communication-circuitry control. In other embodiments, the gesture recognition system 40, or at least the digital processing elements thereof, are embodied in a separate Integrated Circuit (IC) or other assembly, which may include neural processing resources dedicated to implementation of the GRA 78.

Figure 6:
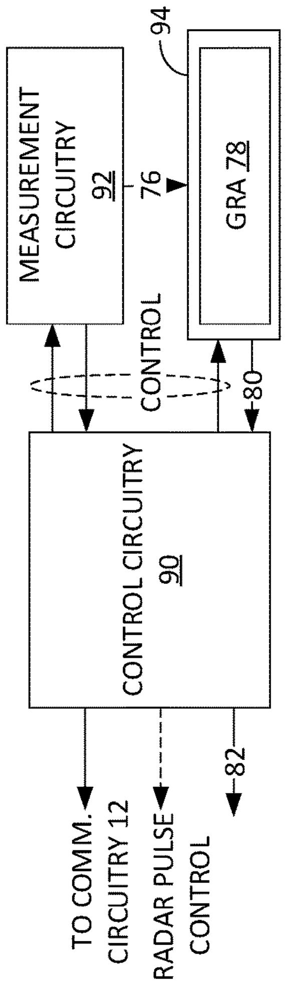
FIG. 6 is a block diagram of an example circuitry arrangement for implementation of a gesture recognition system in a communication device, according to one embodiment.

FIG. 6 illustrates an example arrangement of the gesture recognition system 40, with the understanding that one or more of the depicted elements of the arrangement may be standalone or otherwise dedicated to gesture recognition or may be shared with other functions. The control circuitry 90, e.g., a microprocessor executing stored program instructions, controls gesture recognition operations, such as sending control signals to the communication circuitry 12 to control whether the communication circuitry 12 operates in a communications mode or a gesture-recognition mode.

The control circuitry 90 also may provide direct control of radar pulse emissions, e.g., it may control a radar pulse circuit directly—not shown in the diagram—for emission of radar pulses 60. Further elements include measurement circuitry 92, which may perform the measurements used to obtain the per-bin/per-pulse signal measurements 74, or the communication circuitry 12 may perform those measurements, with the measurement circuitry 92 comprising buffering or queuing logic used to input the overall measurement data 76 into evaluation circuitry 94 that implements the GRA 78.

Any one or more of the control circuitry 90, the measurement circuitry 92, and the evaluation circuitry 94 may be functionally realized in a microprocessor or other digital processor that forms all or part of the processing circuitry 14 shown in FIG. 1, and such circuitry may perform other functions, such as baseband signal processing for communication signals. Thus, in at least one embodiment, the gesture recognition system 40 may be considered as added functionality integrated in or subsumed with the processing circuitry 14 and communication circuitry 12. For example, the communication circuitry 12 includes one or more additional circuit elements that are needed to temporarily repurpose the communication-signal receivers 52 for reception and processing of reflection signals 62 as compared to communication signals 20, such circuitry to set the proper reception frequency and to align individual ones of the communication-signal receivers 52 with respective ones of the frequency bins 66.

However, at least a portion of the gesture recognition system 40 may comprise specialized circuitry used for gesture recognition and, optionally, one or more other Machine-Learning (ML) or Artificial Intelligence (AI) functions implemented in the device 10. For example, the processing circuitry 14 in one or more embodiments includes a Graphics Processing Unit (GPU) or Neural Processor (NP) that implements the gesture recognition algorithm 78.

Figure 7:
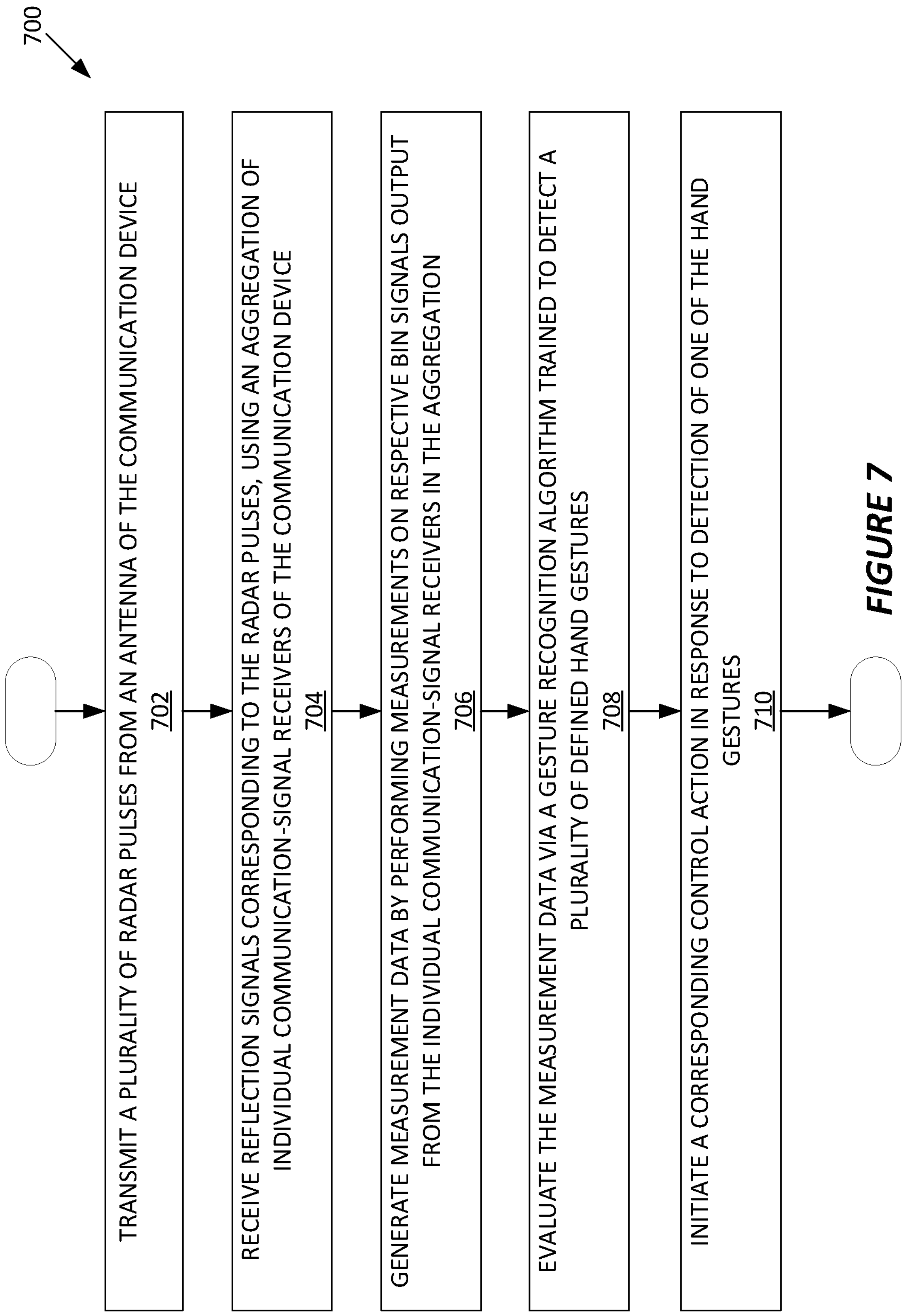
FIG. 7 is a logic flow diagram of a method of operation by a communication device for performing gestured recognition, according to one embodiment.

Regardless of how the gesture recognition system 40 is implemented, FIG. 7 illustrates an embodiment comprising a method 700 of operation by a communication device 10. The method 700 comprises performing gesture detection by:

- transmitting (Block 702) a plurality of radar pulses 60 from an antenna 54 of the communication device 10;
- receiving (Block 704) reflection signals 62 corresponding to respective ones of the radar pulses 60, each reflection signal 62 having a signal bandwidth 64 greater than a receiver bandwidth 68 of individual communication-signal receivers 52 of the device 10, wherein each reflection signal 62 is received using an aggregation of the individual communication-signal receivers 52, with each individual communication-signal receiver 52 in the aggregation tuned to receive signal components of the reflection signal 62 that are within a respective frequency bin 66 of the reflection signal 62 and outputting a corresponding bin signal 72;
- generating (Block 706) measurement data 76 by performing measurements on the respective bin signals 72 obtained for the radar pulses 60;
- evaluating (Block 708) the measurement data 76 via a gesture recognition algorithm 78 trained to detect a plurality of defined hand gestures; and
- initiating (Block 710) a corresponding control action in the device 10, responsive to the gesture recognition algorithm 78 detecting one of the plurality of defined hand gestures.

Transmitting the radar pulses 60 comprises, for example, transmitting the radar pulses 60 using a transmit frequency that is a multiple of a transmit frequency used by the device 10 for transmitting communication signals 18, and using the same multiple to set mixer frequencies used for frequency downconversion by the individual communication-signal receivers 52. The multiple is an integer multiple in one or more embodiments, such as "2", meaning that the signal frequency of the radar pulses 60/reflection signals 62 is twice that of the communication signals 20 received by the communication-signal receiver 52 when they are used for communication-signal reception rather than gesture recognition.

Correspondingly, for performing gesture detection, the method 700 according to such embodiments comprises activating frequency multiplier circuitry. When active, the frequency multiplier circuitry multiplies a Local Oscillator (LO) signal according to the multiple. The LO signal controls transmit and receive frequencies of the communication device 10. An example configuration uses communication-signal frequencies in the 30 GHz range and radar-signal frequencies in the 60 GHz range. In embodiments where the communication-signal frequencies are the same as the radar-signal frequencies, the frequency multiplier circuitry is omitted from the device 10/gesture recognition system 40.

Tuning the individual communication-signal receivers 52 for aggregated use in receiving reflection signals 62 comprises, for example, incrementally offsetting mixer frequencies used by respective ones of the individual communication-signal receivers 52. The incrementally-offset mixer frequencies correspond to the respective frequency bins 66. That is, each of the communication-signal receivers 52 used in aggregation for reflection-signal reception is tuned such that its receiver bandwidth 68 is aligned with spectral frequencies spanned by a respective one of the frequency bins 66.

In one or more implementations of the communication circuitry 12, for each received reflection signal 62, the corresponding bin signals 72 each comprise in-phase (I) and quadrature (Q) signals. The signal measurements made on the bin signals 72 comprise, for example, signal-power measurements, such that the measurement data 76 comprises a reflection intensity map. Each value in the map indicates reflection-signal intensity for a particular one of the radar pulses 60 in a particular frequency bin 66, at a particular reception sampling time with respect to that particular radar pulse 60. Supporting such operations, each communication-signal receiver 52 comprises, for example, an analog-to-digital converter (ADC) that samples the associated bin signal 72 at regular intervals, with sampling triggered by emission of a radar pulse 60 and with the total number of samples taken defining the sampling window.

In one or more embodiments, generating the measurement data 76 comprises forming a radar image as a two-dimensional data set having one dimension defined by a transmission window over which the plurality of radar pulses 60 is transmitted and the other dimension defined by a sampling window used for receiving each reflection signal 62. The individual values in the two-dimensional data set may be understood as radar-image "pixels". In at least one such embodiment, each radar-image pixel is a signal-intensity measurement taken at a particular sampling time within the sampling window, for a particular frequency bin 66 and for a particular radar pulse 60, in the plurality of radar pulses 60.

According to at least one embodiment, the gesture recognition algorithm 78 comprises a convolutional neural network CNN that is trained using representative measurement data 76 characteristic for respective ones of the defined hand gestures. Other machine-learning implementations may be used for implementation of the gesture recognition algorithm 78. Regardless of its implementation details, there may be an index value or other identifier assigned to each hand gesture in a defined set of hand gestures to be recognized by the device 10, and the gesture recognition algorithm 78 may indicate detection of a defined hand gesture by outputting the value of the index or identifier assigned to the detected gesture.

Thus, the indication 80 depicted in FIG. 4 may be an index or identifier value that identifies the particular gesture detected by the device 10, from among a predefined set of hand gestures. Regardless of the particulars of the indication 80, initiating a corresponding control action responsive to recognizing a hand gesture comprises outputting a message or signaling 82 providing an indication 80 of the detected hand gesture, for use by a software application running on a host processor of the communication device 10.

In at least one embodiment, the method 700 comprises performing the gesture detection in a time multiplexing arrangement that uses communication circuitry 12 of the communication device 10 during one or more first times for communicating and uses the communication circuitry 12 during one or more second times for performing the gesture detection. The communication circuitry 12 involved in the reuse includes at least the individual communication-signal receivers 52 that are operated in the aggregate for reception and processing of the reflection signals 62. One example of time-multiplexed operation of the communication circuitry 12 between gesture-recognition operations and communications operations involves one or more software applications running on the device 10. The software application(s) use one or more communication services that involve communicating with a remote device or server via the communication circuitry 12 and include one or more gesture-input functions, in which control actions are taken responsive to the detection of specific hand gestures by the user of the device 10.

A corresponding example comprises a communication device 10 that includes communication circuitry 12 and processing circuitry 14 that is configured to control the communication circuitry 12 to: (a) transmit a plurality of radar pulses 60 from an antenna 54 of the communication device 10, and (b) receive reflection signals 62 corresponding to respective ones of the radar pulses 60, each reflection signal 62 having a signal bandwidth 64 greater than a receiver bandwidth 68 of individual communication-signal receivers 52 of the communication device 10. Each reflection signal 62 is received using an aggregation of the individual communication-signal receivers 52. Each individual communication-signal receiver 52 in the aggregation is tuned to receive signal components of the reflection signal 62 that are within a respective frequency bin 66 of the reflection signal 62 and outputs a corresponding bin signal 72.

The processing circuitry 14 is further configured to: (c) generate measurement data 76 by performing measurements on the respective bin signals 72 obtained for the plurality of radar pulses 60; (d) evaluate the measurement data 76 via a gesture recognition algorithm 78 trained to detect a plurality of defined hand gestures; and (e) initiate a corresponding control action in the communication device 10, responsive to the gesture recognition algorithm 78 detecting one of the plurality of defined hand gestures.

The radar pulses 60 have a signal frequency that is a multiple of a signal frequency used by the communication device 10 for transmitting communication signals 18, for example. In such cases, the processing circuitry 14 uses the same multiple to set mixer frequencies used for frequency downconversion by the individual communication-signal receivers 52. "Setting" the mixer frequencies in this sense comprises, in at least one embodiment, outputting a control signal or signals that switches in or otherwise actives circuitry associated with the communication-signal receivers 52 that changes the mixing frequencies used by them, for tuning them to reception frequencies corresponding to the frequency bins 66 that logically subdivide the spectrum occupied by the reflection signals 62. Such circuitry may be considered as belonging to the gesture recognition system 40.

As a particular example, in at least one embodiment, for performing gesture detection, the processing circuitry 14 is configured to activate frequency multiplier circuitry that, when active, multiplies a LO signal according to the multiple, the LO signal controlling transmit and receive frequencies of the communication device 10. Such an arrangement is advantageous in implementations where the signal frequency to be used for the radar pulses 60 is above the signal frequency or frequency bands used for communication signals. Correspondingly, in implementations of the device 10 where the communication-signal frequencies and the targeted radar-signal frequencies are the same, the frequency-multiplier circuitry is not needed.

However, the gesture recognition system 40 would still include the circuitry used to create offset mixer frequencies for the individual communication-signal receivers 52 that are aggregated for reception and processing of the reflection signals 62, to "place" the receiver bandwidth 68 of each such communication-signal receiver 52 at a respective one of the frequency bins 66. That is, for subdividing the spectral band occupied by the reflection signals 62 into sub-bands and using individual ones of the aggregated communication-signal receivers 52 for receiving signal components within a respective one of the sub-bands—i.e., frequency bins 66—the individual communication-signal receivers 52 are tuned according to incrementally offset mixer frequencies used by respective ones of the individual communication-signal receivers 52. Here, the incrementally-offset mixer frequencies correspond to the respective frequency bins 66.

In at least one embodiment of the device 10, for each reflection signal 62 received by the device 10, the corresponding bin signals 72 each comprise in-phase I and quadrature Q signals. The measurements made on the bin signals 72 comprise signal-power measurements as the aforementioned measurements 74 (e.g., I-signal power measurements and Q-signal power measurements). This approach yields measurement data 76 comprising a reflection intensity map, wherein each value in the map indicates reflection-signal intensity at a particular reception sampling time, for a particular one of the radar pulses 60 and in a particular one of the frequency bins 66.

The processing circuitry 14 in at least one embodiment is configured to generate the measurement data 76 as a radar image comprising a two-dimensional data set having one dimension defined by a transmission window over which the plurality of radar pulses 60 is transmitted and the other dimension defined by a sampling window used for receiving each reflection signal 62. The individual values in the two-dimensional data set are radar-image pixels, with each radar-image pixel being a signal-intensity measurement taken at a particular sampling time within the sampling window, for a particular frequency bin 66 and for a particular radar pulse 60, in the plurality of radar pulses 60.

The processing circuitry 14 in at least one embodiment is configured to control the communication device 10 to perform gesture detection in a time multiplexing arrangement that uses communication circuitry 12 of the communication device 10 during one or more first times for communicating and uses the communication circuitry 12 during one or more second times for performing the gesture recognition. To initiate a corresponding control action responsive to recognizing a gesture, the processing circuitry 14 in one or more embodiments is configured to output a message or signaling 82 that provides an indication 80 of the detected hand gesture, for use by a software application running on a host processor of the communication device 10.

Figure 8:
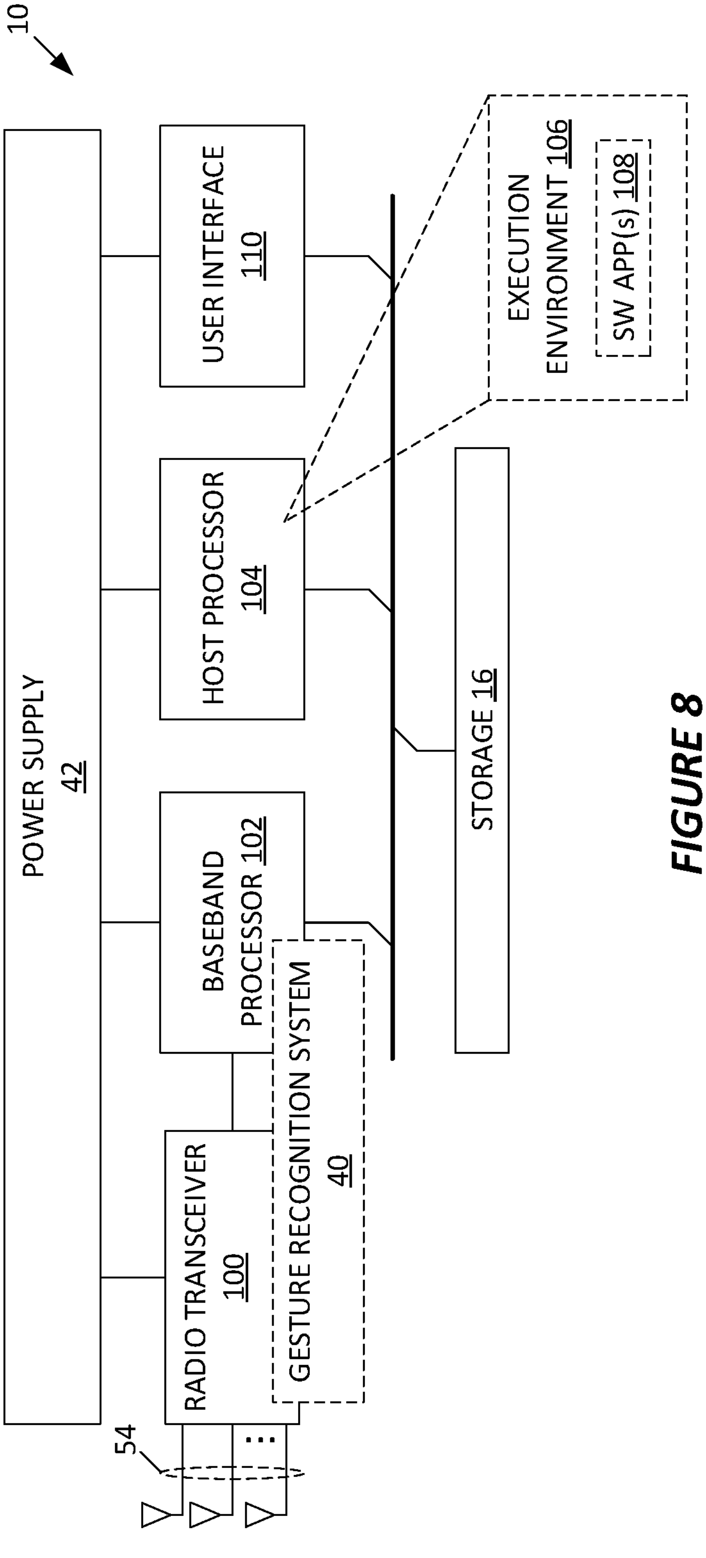
FIG. 8 is a block diagram of another embodiment of a communication device that is configured for gesture recognition.

FIG. 8 illustrates details for another example of a communication device 10, wherein a 20) radio transceiver 100 represents an example of the communication circuitry 12 introduced in FIG. 1, and a baseband processor 102 represents an example of the processing circuitry 14 introduced in FIG. 1. According to this arrangement, in addition to being configured for communication-signal transmission and reception, the radio transceiver 100 is configured for radar-signal transmission and reflection-signal reception, e.g., it includes circuitry for generating/emitting radar pulses 60 and it includes circuitry for operating a plurality of the individual communication-signal receivers 52 of the radio transceiver 100 in aggregated fashion, as described herein for receiving and processing reflection signals 62 corresponding to emitted radar pulses 60.

The baseband processor 102 controls the radio transceiver 100 for communication-signal operations and for gesture-detection operations. In addition to providing baseband processing for communication-transmission and reception, the baseband processor 102 controls time-multiplexing (shared use) of the communication-signal receivers 52 between communication-signal use and gestured-recognition use. In at least one embodiment, the baseband processor 102 performs gesture recognition responsive to signaling from a host processor 104, which provides an execution environment 106—e.g., a runtime environment—to run one or more software applications 108. Such applications 108 may request gesture-recognition, resulting in signaling going from the host processor 104 to the baseband processor 102, or may otherwise receive gesture-related signaling, e.g., indications of recognized gestures, based on such signaling flowing from the baseband processor 102 to the host processor 104.

Example implementations of the baseband processor 102 include one or more microprocessors or other programmatically-configured digital circuitry that is specially adapted to perform the gesture-recognition operations described herein, based on the execution of computer programs stored in computer-readable media. The storage 16 shown in FIG. 8 and in FIG. 1 stands as an example of such media, and it comprises, for example, one or more types of memory or storage devices, such as SRAM, DRAM, FLASH, EEPROM, Solid State Disk (SSD), or any mix thereof. The storage 16 provides, for example, volatile, working memory for program execution and data processing, along with non-volatile memory for longer-term storage of computer programs and/or configuration data.

The device 10 depicted in the example of FIG. 8 also includes a user interface 110, which comprises a touch-screen, for example, such as may be used for providing control inputs or displaying output data associated with execution of the software application(s) 108. In at least one embodiment, the device 10 uses gesture recognition as an alternate or additional means of user interaction.

Figure 9:
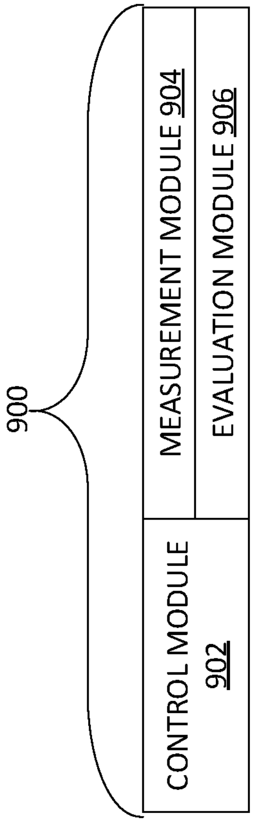
FIG. 9 is a block diagram of yet another embodiment of a communication device that is configured for gesture recognition.

FIG. 9 depicts another example implementation of the processing elements associated with the gesture recognition system 40, such as may be functionally realized by the processing circuitry 14 shown in FIG. 1 or by the baseband processor 102 shown in FIG. 7, e.g., based on the execution of computer program instructions stored in a memory. Here, the processing elements may be referred to a "processing units" or "processing modules" or simply "units" or "modules" and they comprise logic configured to carry out the control and processing operations attributed to the gesture recognition system 40. A set of modules 900 comprises a control module 902, a measurement module 904, and an evaluation module 906.

The control module 902 controls or otherwise initiates the transmission of the plurality of radar pulses 60 from an antenna 54 of the communication device 10, and the corresponding reception of reflection signals 62 corresponding to respective ones of the radar pulses 60. The measurement module 904 generates the measurement data 76 by performing measurements on the respective bin signals 72 obtained for the plurality of radar pulses 60, or at least receiving and organizing such measurements from measurement circuitry implemented in the communication circuitry 12/radio transceiver 100. The evaluation module 906 implements the gesture recognition algorithm 78, and the control module 902 initiates a corresponding control action in the communication device 10, responsive to the gesture recognition algorithm 78 detecting one of the plurality of defined hand gestures.

With the above example embodiments in mind, an example communication device, such as a User Equipment (UE) or other handheld electronic device, includes millimeter wave (mmW) communication circuitry. Particularly, the device includes multiple mmW receivers-receive signal processing chains-such as for beamforming and/or improved signal reception—and some or all such receivers are repurposed temporarily, for receiving reflection signals corresponding to radar pulses 60 emitted by the device 10, for detecting hand gestures by a user of the device 10. Repurposing involves, for example, retuning the receivers so that they are configured for reception of the signal frequencies associated with the emitted radar pulses 60, in cases where the communication-signal frequencies differ from the radar-signal frequency. Such retuning is done, for example, by multiplying the LO signal that is otherwise used by the receivers for communication-signal reception.

The frequency of the offset LO for each receiver is set in such a way that the downconverted signal from each receiver is from a different frequency bin 66 of a received reflection signal 62. Thus, in aggregation, all the frequency information of the received reflection signal 62 is captured by with plurality of receivers used to receive it. The downconverted signal output from each receiver, e.g., the bin signal provided by the receiver, comprises I and Q components of the received reflection signal, for example.

The downconverted I and Q signals from each receiver, representing the respective frequency bins 66 of the received reflection signal 62, are integrated within the sampling time of the ADCs of the receivers. Corresponding powers of the integrated I and Q signals are measured via the receivers' ADCs. Such measurements form a data set that may be referred to as a radar image, as explained earlier herein. Images obtained for a defined set of hand gestures serve as training input for a gesture recognition algorithm that is based on Machine Learning (ML). For example, pluralities of radar images corresponding to each gesture in a defined set of gestures are used to train a CNN, which operates as the gesture recognition algorithm.

Aspects of such operation include:

- utilizing receivers of a multi-antenna device, e.g., receivers in a beamforming array;
- tuning the respective receivers to different frequency bins of a reflection signal, by offsetting the LO frequency applied to respective ones of the receivers;
- measuring I and Q signals output by each receiver, by integrating over the sampling time for the ADC of each receiver;
- performing calibration for path and frequency correction for measurement data for the I and Q signals;
- performing continuous measurements for each gesture movement, with slow time data (successive pulses in a plurality of radar pulses);
- creating slow time vs fast frequency image data based on the measured I and Q data for each frequency bin;
- using ML, such as a CNN, to recognize gestures; and
- translating available fast-time/slow-time images for gesture detection to fast-frequency/slow-time images, to create data sets for CNN training—that is, high-resolution radar-sensing data in the time domain that is characteristic of each gesture in a defined set of gestures may be transformed into the frequency domain as training data for the CNN, such that the CNN recognizes fast-frequency/slot-time images later acquired by the device during live radar sensing.

Figure 10:
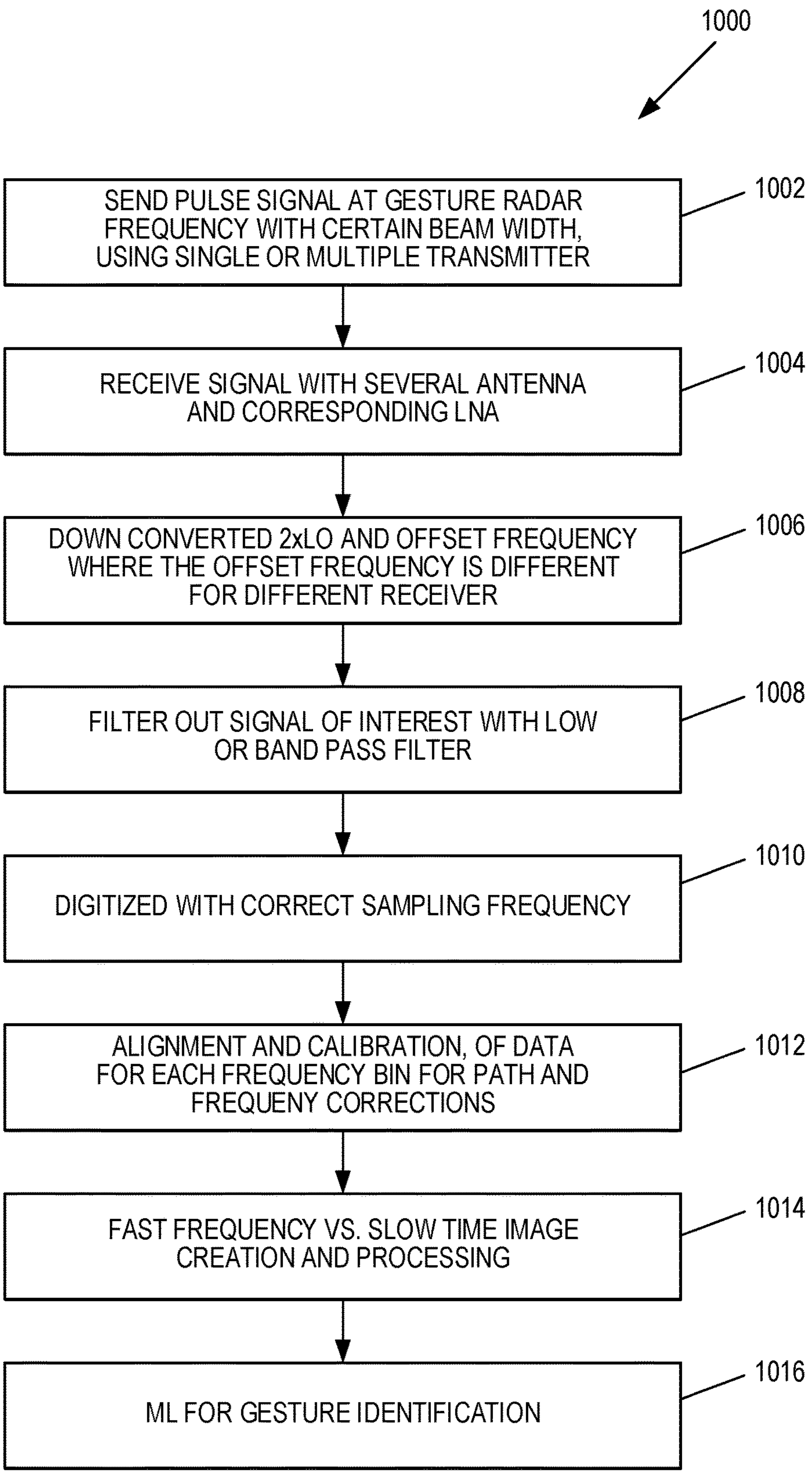
FIG. 10 is a logic flow diagram of a method of operation by a communication device for performing gesture recognition, according to another embodiment.

FIG. 10 illustrates an example embodiment comprising a method 1000, performed by a communication device, such as the communication device 10 of FIG. 1. The depicted details assume that the radar-signal frequency is twice—2×—the communication-signal frequency and, hence, "2×LO" indicates a LO frequency that is twice that of the LO frequency used by the involved communication-signal receivers 52 for downconversion of communication signals.

The method 1000 includes sending (Block 1002) a pulse signal at the gesture radar frequency, with a certain beam width, using a single transmitter or multiple transmitters of the device 10. The method 1000 continues with the device 10 receiving (Block 1004) the corresponding reflection signal via several antennas 54 of the device 10, each antenna path including a corresponding Low Noise Amplifier (LNA).

Each receiver downconverts (Block 1006) that portion of the reflection signal it receives—i.e., the portion of the reflection signal within the respective frequency bin to which the receiver is tuned, based on the offset frequency used to set the mixing frequency used by the receiver for downconversion. The method 1000 continues with each receiver filtering (Block 1008) its bin signal with a low pass filter, to eliminate or at least attenuate unwanted signal components, and digitizing (Block 1010) the bin signal at the sampling frequency used for reflection-signal processing, which may be the same or different than the sampling frequency used for communication-signal processing. A bandpass filter may be used instead of a low pass filter, in one or more implementations, e.g., depending on system implementation and the need for clock-noise suppression.

The method 1000 may also include performing (Block 1012) alignment and calibration of the bin signals—i.e., the digital samples taken thereof-across the plurality of communication-signal receivers 52 used for receiving and processing the reflection signal. In this regard, it should be appreciated that the bin signals should be aligned in time, so that sampling is coherent across the bin signals.

Processing continues with the creation and processing (Block 1014) of a radar image formed from the bin-signal measurements. This image may be referred to as a fast frequency vs. slow time image, to denote that one dimension of the image refers to the fast sampling that happens across the frequency bins for each received reflection signal (i.e., samples within the sampling window) versus the slower time represented by succession of radar pulse transmissions (i.e., the transmission window). Processing further continues with the use of ML for gesture identification (Block 1016).

Figure 11:
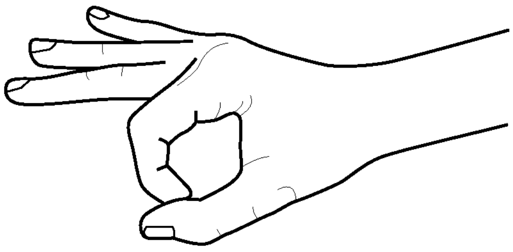
FIG. 11 is a diagram of an example hand gesture, such as may be represented in a defined set of hand gestures that are recognizable by a communication device.
Figure 12:
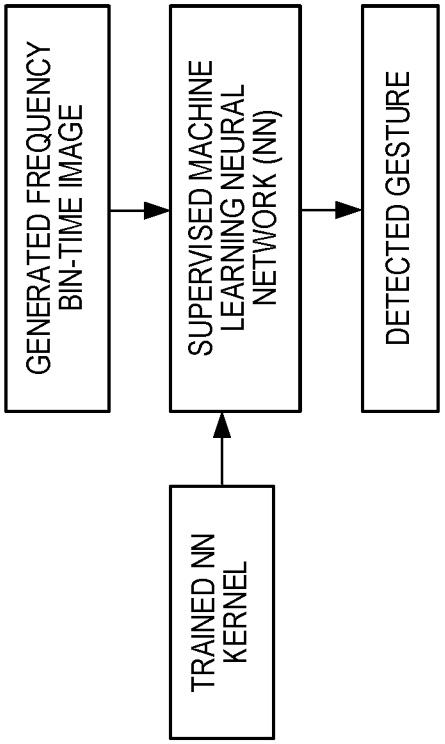
FIG. 12 is a block diagram of one embodiment of a signal processing and data flow, for processing measurement data obtained from received reflection signals, for gesture recognition.

FIG. 11 depicts an example of a defined hand gesture, where the gesture may be referred to as the "Okay" gesture. FIG. 12 depicts a processing-and-data arrangement associated with recognizing such gestures. In particular, FIG. 12 depicts the use of a trained neural network (NN) kernel for recognizing gestures. The trained NN kernel comprises, for example, sets of activations based on training data.

Figure 13:
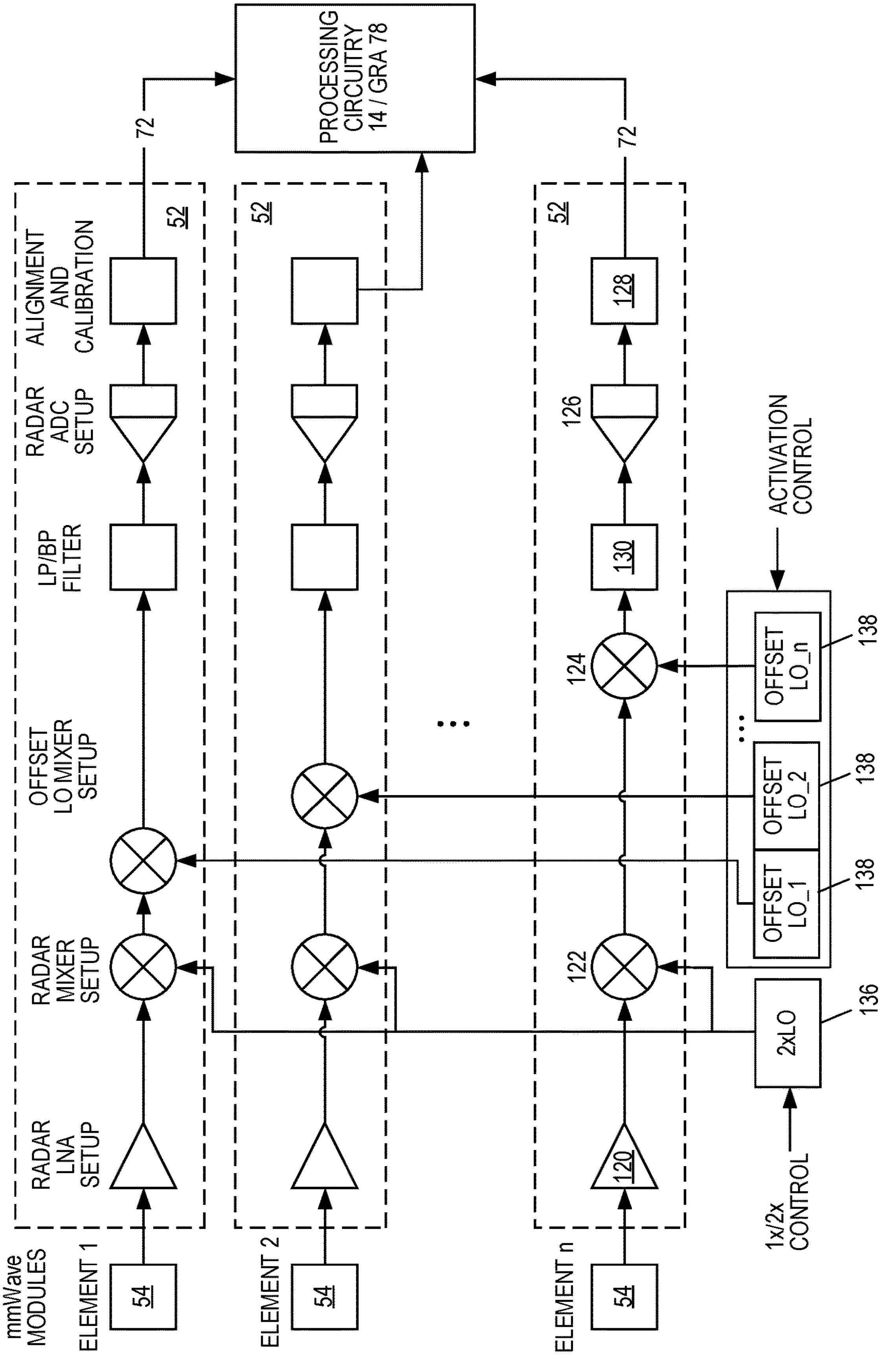
FIG. 13 is a block diagram of one embodiment of communication-signal receivers and corresponding circuitry supporting use of the receivers for communication-signal reception and reuse of the receivers for reflection-signal reception.

FIG. 13 illustrates example details for the communication-signal receivers 52, where there are "N" such receivers, with N being a positive integer greater than one. Each receiver 52 is associated with a respective antenna 54, which may be an antenna element in an array or panel used for beamforming reception by the device 10.

The received-signal processing path or chain provided by each receiver 52 includes a LNA 120, a first mixer 122, a second mixer 124, a low-pass filter 130, an ADC 126, and calibration/alignment circuitry 128. FIG. 13 assumes that gesture detection uses a signal frequency that is twice that of the communication-signal frequency. Thus, the first mixer 122 is used in a 1×LO mode for communication-signal processing and in 2×LO mode for reflection-signal processing, e.g., the reflection-signal frequency is 2× that of the communication-signal frequency. The processing circuitry 14 may output a 1×/2× control signal, to control whether the mixer 122 uses the 1× or 2× mixing frequency.

A second mixer 124 is active for reflection-signal processing and, again, can be activated/deactivated via control signaling from the processing circuitry 14. The second mixer 124 adds an offset frequency that tunes the receiver 52 to a respective frequency bin 66 of the spectrum occupied by reflection signals 62—refer to FIG. 3. A low-pass filter 130 in advance of an ADC 126 controls the input frequencies to the ADC 126—i.e., unwanted frequencies are suppressed to prevent aliasing problems. The ADC 126 produces digitized samples constituting a digitized bin signal 72, and calibration/alignment circuitry 128 provides for time alignment of the signals/samples across the receiver paths. The diagram shows the aligned/digitized bin signals 72 feeding into the processing circuitry 14.

A LO 136 operates in 1× or 2×mode, responsive to a control signal, and feeds the first mixer 122. Similarly, a set of offset LOs 138 provides respective offset-frequency signals to the corresponding second mixers 124, for the frequency-bin offsetting. The LOs 138 are active or inactive in dependence on activation control signaling.

Figure 14:
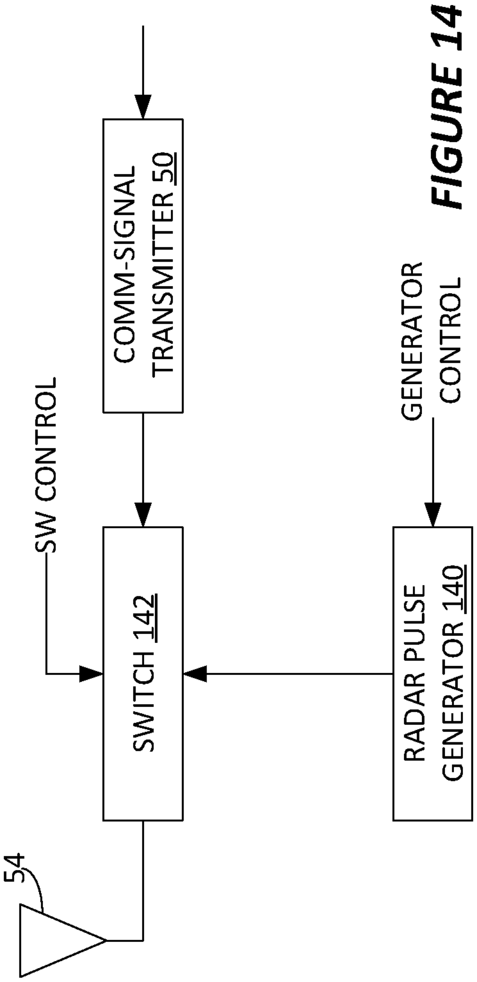
FIG. 14 is a block diagram of one embodiment of circuitry in a communication device, for generation and transmission of radar pulses.

FIG. 14 illustrates one embodiment of the communication device 10, with respect to radar-pulse generation and emission. In the example arrangement, the communication device 10 includes a dedicated radar pulse transmitter 140 that is responsive to generator control signaling, which is provided by the processing circuitry 14 in one or more embodiments. A switch 142 controls whether an antenna 54 of the device 10 is coupled with the radar pulse transmitter 140 or with one of the communication-signal transmitters 50 of the device 10. Switch-control signaling output from the processing circuitry 14 controls the switch 142, in one or more embodiments, for switching between a communication mode and a gesture-recognition mode. The switch 142 may also provide for switching the antenna 54 from reception mode and transmission mode, for half-duplex operation in the communication mode, or one or more additional switches not shown may provide for such switching.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation by a communication device, the method comprising performing gesture detection by:

transmitting a plurality of radar pulses from an antenna of the communication device, each radar pulse having a signal bandwidth greater than a receiver bandwidth of individual communication-signal receivers of the communication device;

receiving reflection signals corresponding to respective ones of the radar pulses, each reflection signal having a same signal bandwidth as the radar pulses, wherein each reflection signal is received using an aggregation of the individual communication-signal receivers, with each individual communication-signal receiver in the aggregation tuned to receive signal components of the reflection signal that are within a respective frequency bin of the reflection signal and outputting a corresponding bin signal;

generating measurement data by performing measurements on the respective bin signals obtained for the plurality of radar pulses;

evaluating the measurement data via a gesture recognition algorithm trained to detect a plurality of defined hand gestures; and initiating a corresponding control action in the communication device, responsive to the gesture recognition algorithm detecting one of the plurality of defined hand gestures;

wherein tuning the individual communication-signal receivers comprises incrementally offsetting mixer frequencies used by respective ones of the individual communication-signal receivers, the incrementally offset mixer frequencies corresponding to the respective frequency bins.

2. The method of claim 1, wherein transmitting the radar pulses comprises transmitting the radar pulses using a signal frequency that is a multiple of a signal frequency used by the communication device for transmitting communication signals, and wherein the method comprises using the same multiple to set the mixer frequencies used for frequency downconversion by the individual communication-signal receivers.

3. The method of claim 2, wherein, for performing gesture detection, the method comprises activating frequency multiplier circuitry that, when active, multiplies a Local Oscillator (LO) signal according to the multiple, the LO signal controlling transmit and receive frequencies of the communication device.

4. The method of claim 1, wherein, for each reflection signal, the corresponding bin signals each comprise in-phase (I) and quadrature (Q) signals, and wherein the measurements made on the bin signals comprise signal-power measurements, such that the measurement data comprises a reflection intensity map, wherein each value in the map indicates reflection-signal intensity at a particular reception sampling time, for a particular one of the radar pulses and in a particular one of the frequency bins.

5. The method of claim 1, wherein generating the measurement data comprises forming a radar image as a two-dimensional data set having one dimension defined by a transmission window over which the plurality of radar pulses is transmitted, and the other dimension defined by a sampling window used for receiving each reflection signal.

6. The method of claim 5, wherein the individual values in the two-dimensional data set are radar-image pixels, with each radar-image pixel being a signal-intensity measurement taken at a particular sampling time within the sampling window, for a particular frequency bin and for a particular radar pulse, in the plurality of radar pulses.

7. The method of claim 1, wherein initiating the corresponding control action comprises providing a message or signaling that includes an indication of the detected hand gesture, for use by a software application running on a host processor of the communication device.

8. The method of claim 1, wherein the gesture recognition algorithm comprises a convolutional neural network (CNN) that is trained using representative measurement data characteristic for respective ones of the defined hand gestures.

9. The method of claim 1, wherein the method comprises performing the gesture detection in a time multiplexing arrangement that uses communication circuitry of the communication device during one or more first times for communicating and uses the communication circuitry during one or more second times for performing the gesture recognition, the communication circuitry including the individual communication-signal receivers.

10. A communication device comprising:

communication circuitry; and processing circuitry configured to control the communication circuitry to:

transmit a plurality of radar pulses from an antenna of the communication device, each radar pulse having a signal bandwidth greater than a receiver bandwidth of individual communication-signal receivers of the communication device; and receive reflection signals corresponding to respective ones of the radar pulses, each reflection signal having a same signal bandwidth as the radar pulses, wherein each reflection signal is received using an aggregation of the individual communication-signal receivers, with each individual communication-signal receiver in the aggregation tuned to receive signal components of the reflection signal that are within a respective frequency bin of the reflection signal and outputting a corresponding bin signal;

wherein the individual communication-signal receivers are tuned according to incrementally offset mixer frequencies used by respective ones of the individual communication-signal receivers, the incrementally offset mixer frequencies corresponding to the respective frequency bins; and wherein the processing circuitry is further configured to:

generate measurement data by performing measurements on the respective bin signals obtained for the plurality of radar pulses;

evaluate the measurement data via a gesture recognition algorithm trained to detect a plurality of defined hand gestures; and initiate a corresponding control action in the communication device, responsive to the gesture recognition algorithm detecting one of the plurality of defined hand gestures.

11. The communication device of claim 10, wherein the radar pulses have a signal frequency that is a multiple of a signal frequency used by the communication device for transmitting communication signals, and wherein the processing circuitry uses the same multiple to set the mixer frequencies used for frequency downconversion by the individual communication-signal receivers.

12. The communication device of claim 11, wherein, for performing gesture detection, the processing circuitry is configured to activate frequency multiplier circuitry that, when active, multiplies a Local Oscillator (LO) signal according to the multiple, the LO signal controlling transmit and receive frequencies of the communication device.

13. The communication device of claim 10, wherein, for each reflection signal, the corresponding bin signals each comprise in-phase (I) and quadrature (Q) signals, and wherein the measurements made on the bin signals comprise signal-power measurements, such that the measurement data comprises a reflection intensity map, wherein each value in the map indicates reflection-signal intensity at a particular reception sampling time, for a particular one of the radar pulses and in a particular one of the frequency bins.

14. The communication device of claim 10, wherein the processing circuitry is configured to generate the measurement data as a radar image comprising a two-dimensional data set having one dimension defined by a transmission window over which the plurality of radar pulses is transmitted and the other dimension defined by a sampling window used for receiving each reflection signal.

15. The communication device of claim 14, wherein the individual values in the two-dimensional data set are radar-image pixels, with each radar-image pixel being a signal-intensity measurement taken at a particular sampling time within the sampling window, for a particular frequency bin and for a particular radar pulse, in the plurality of radar pulses.

16. The communication device of claim 10, wherein, to initiate the corresponding control action, the processing circuitry is configured to output a message or signaling that provides an indication of the detected hand gesture, for use by a software application running on a host processor of the communication device.

17. The communication device of claim 10, wherein the gesture recognition algorithm comprises a convolutional neural network (CNN) that is trained using representative measurement data characteristic for respective ones of the defined hand gestures.

18. The communication device of claim 10, wherein the processing circuitry is configured to control the communication device to perform gesture detection in a time multiplexing arrangement that uses communication circuitry of the communication device during one or more first times for communicating and uses the communication circuitry during one or more second times for performing the gesture recognition, the communication circuitry including the individual communication-signal receivers.

19. The communication device of claim 18, wherein the communication circuitry is configured to transmit radar pulses from two or more antennas of the communication device, using one or more communication-signal transmitters or dedicated radar-pulse transmitters.

* * * * *